(12) United States Patent
Shi

(10) Patent No.: US 9,378,344 B2
(45) Date of Patent: Jun. 28, 2016

(54) METHOD AND APPARATUS FOR PROTECTING INFORMATION BASED ON DATA CARD

(75) Inventor: Qian Shi, Shenzhen (CN)

(73) Assignee: ZTE Corporation, Guangdong (CN)

( * ) Notice: Subject to any disclaimer, the term of this patent is extended or adjusted under 35 U.S.C. 154(b) by 40 days.

(21) Appl. No.: 13/259,931

(22) PCT Filed: May 21, 2010

(86) PCT No.: PCT/CN2010/073064
§ 371 (c)(1),
(2), (4) Date: Sep. 23, 2011

(87) PCT Pub. No.: WO2010/145402
PCT Pub. Date: Dec. 23, 2010

(65) Prior Publication Data
US 2012/0204268 A1   Aug. 9, 2012

(30) Foreign Application Priority Data
Oct. 22, 2009   (CN) .......................... 2009 1 0206625

(51) Int. Cl.
*G06F 7/04*   (2006.01)
*G06F 21/31*   (2013.01)
*G06F 21/79*   (2013.01)

(52) U.S. Cl.
CPC ............... *G06F 21/31* (2013.01); *G06F 21/79* (2013.01)

(58) Field of Classification Search
CPC .................................. G06F 21/31; G06F 21/79
See application file for complete search history.

(56) References Cited

U.S. PATENT DOCUMENTS

| 7,062,623 | B2 * | 6/2006 | Vogt et al. ...................... 711/164 |
| 7,370,166 | B1 * | 5/2008 | Ramesh .............. G06F 21/6218 711/105 |
| 2006/0004974 | A1 * | 1/2006 | Lin et al. ....................... 711/164 |
| 2006/0184806 | A1 * | 8/2006 | Luttmann et al. ............. 713/193 |
| 2007/0133555 | A1 * | 6/2007 | Kim .......................... 370/395.3 |
| 2007/0271596 | A1 * | 11/2007 | Boubion et al. .................. 726/3 |
| 2007/0288664 | A1 * | 12/2007 | Kim ................... 710/1 |
| 2009/0222500 | A1 * | 9/2009 | Chiu et al. .................... 707/205 |
| 2011/0055589 | A1 * | 3/2011 | Hsieh ................. G06F 12/1433 713/189 |

FOREIGN PATENT DOCUMENTS

CN   1536485 A   10/2004
CN   101141354 A   3/2008
(Continued)

OTHER PUBLICATIONS

Microsoft Computer Dictionary, Fifth Edition, Microsoft Press, Redmond, Washington, 2002.*

(Continued)

*Primary Examiner* — Techane Gergiso
(74) *Attorney, Agent, or Firm* — Venable LLP; Jeffri A. Kaminski

(57) ABSTRACT

The present invention discloses a method and apparatus for protecting information based on a data card, and the method comprises: selecting information which needs to be hidden in a terminal device; and storing said information which needs to be hidden in a hidden partition of the data card. The present invention makes attackers not perceive the existence of the information and increases the security of the information in the data card, so as to protect the user's private information better.

8 Claims, 6 Drawing Sheets

(56) References Cited

FOREIGN PATENT DOCUMENTS

| | | |
|---|---|---|
| CN | 201118713 Y | 9/2008 |
| CN | 101661442 A | 3/2010 |

OTHER PUBLICATIONS

International Search Report, dated Sep. 2, 2010, issued in counterpart International Application No. PCT/CN2010/073064.

* cited by examiner

METHOD AND APPARATUS FOR PROTECTING INFORMATION BASED ON DATA CARD

FIELD OF THE INVENTION

The present invention relates to communication field, and in particular, to a method and apparatus for protecting information based on a data card.

BACKGROUND OF THE INVENTION

When a notebook computer is connected to via a universal serial bus (referred to as USB) interface, the users of the notebook computer can surf the web anywhere anytime, using a universal subscriber identity module (referred to as USIM)/subscriber identity module (referred to as SIM) card to be registered in the mobile network and a data card (including USB modem) to be connected to the Internet. The third generation mobile communications (referred as to 3G) network has been very popular in foreign countries, and the web surfing speed by using a data card can be as high as that of the broadband. With the continuous maturity of domestic 3G network services in China, more and more users will use data cards.

In addition to using the mobile communication network to access the Internet, a data card also has functions of receiving and sending short messages and storing business cards list. Therefore, a lot of private information of users may be contained in the data card. Since the storage space of a USIM card is limited, it is impossible to save all the private information in the USIM card. If the information is stored directly in the computer, it is unsafe because the computer virus is rampant nowadays. In order to protect these data, the users urgently need a method for storing the data information safely.

There are methods for hiding the menu and data in the mobile terminal exist in relevant art, but for the software installed in the computer, even if the function menu is concealed, the security level of the user's data information files stored in the computer is still very low and attackers can acquire the information easily. What's more, there also are methods for protecting the information in the mobile terminal by means of encryption. However, the security of encrypted information is relatively low. In addition, there also are methods adopting short message instruction distant control to encrypt or clean the specific information in a cell phone, thereby playing a certain protective action to the information in a stolen cell phone, however, by these methods the information of a data card in use is only protected by encryption, which cannot be very effective. It can be concluded that the security described above is relatively low, which cannot satisfy the needs of users well.

SUMMARY OF THE INVENTION

The present invention is provided in view of the problem in relevant art that the security of methods for protecting the data information is relatively low. For this purpose, the main object of the present invention is to provide a method and apparatus for protecting the information based on a data card, so as to solve the above problems.

To achieve the above object, according to one aspect of the present invention, a method for protecting the information based on a data card is provided.

The method for protecting information based on a data card according to the present invention comprises: selecting information which needs to be hidden in a terminal device; and storing said information which needs to be hidden in a hidden partition of the data card.

Preferably, after the information which needs to be hidden is stored in the hidden partition of the data card, the above method further comprises: deleting the information which needs to be hidden and is stored in the terminal device.

Preferably, before the information which needs to be hidden in the terminal device is selected, it further comprises: acquiring input information of a user; determining that the input information meets a predetermined condition of the data card; and activating a hidden function of the data card by using the predetermined condition.

Preferably, the predetermined condition comprises one of the following: a short message with specific content of a specific user, or a specific key composition.

Preferably, determining that the input information meets the predetermined condition of the data card comprises: determining whether the addressee's number of the short message in the input information is the number of the specific user, and if yes, determining whether the content of the short message in the input information is the specific content, and if yes, then determining that the input information meets the predetermined condition of the data card; or, determining whether the content of the short message in the input information is the specific content, and if yes, determining whether the addressee's number of the short message in the input information is the number of the specific user, and if yes, then determining that the input information meets the predetermined condition of the data card.

Preferably, determining that said input information meets the predetermined condition of the data card comprises: determining whether the input information is the specific key composition, and if yes, then determining that the input information meets the predetermined condition of the data card.

Preferably, the predetermined condition is stored in the hidden partition of the data card's flash.

Preferably, before the information which needs to be hidden in the terminal device is selected, the above method further comprises: determining whether the predetermined condition has been set for the data card, and if not, then entering into a setting interface of the data card to set the predetermined condition.

To achieve the above object, according to another aspect of the present invention, an apparatus for protecting the information based on a data card is provided.

The apparatus for protecting information based on a data card according to the present invention comprises: a selection module, configured to select information which needs to be hidden in a terminal device; and a storage module, configured to store the information which needs to be hidden in a hidden partition of the data card.

Preferably, the above apparatus further comprises: a deletion module, configured to delete the information of the data card stored in the terminal device.

Preferably, the above apparatus further comprises: an acquisition module, configured to acquire input information of a user; a determination module, configured to determine that the input information meets predetermined condition of the data card; and an activation module, configured to activate a hidden function of the data card by using the predetermined condition.

Preferably, the predetermined condition comprises one of the followings: a short message with specific content of a specific user, or a specific key composition.

By means of the present invention, the problem in relevant art that the security of methods for protecting the data information is relatively low is solved by selecting information which needs to be hidden in a terminal device and storing the information which needs to be hidden in a hidden partition of a data card, which makes attackers not perceive the existence of the information and increases the security of the data information in the terminal device, so as to protect the user's private information better.

BRIEF DESCRIPTION OF THE DRAWINGS

The drawings illustrated here provide a further understanding of the present invention and form a part of the present application. The exemplary embodiments and the description thereof are used to explain the present invention, and do not constitute undue limitation on the scope of the present invention. In the drawings.

DETAILED DESCRIPTION OF EMBODIMENTS

Considering the existing problems in the relevant art, a solution for protecting information based on a data card is provided in the embodiments of the present invention, and the processing principle thereof is: selecting information which needs to be hidden in a terminal device; and storing said information which needs to be hidden in a hidden partition of the data card. This solution increases the security of the information in the data card, so as to protect the user's private information better.

The present invention is described hereinafter in detail with reference to the drawings and in combination with the embodiments. It should be noted that the embodiments and the features of the embodiments in the present application can be combined with each other in the circumstances that there is no conflict.

Method Embodiments

Figure 1:
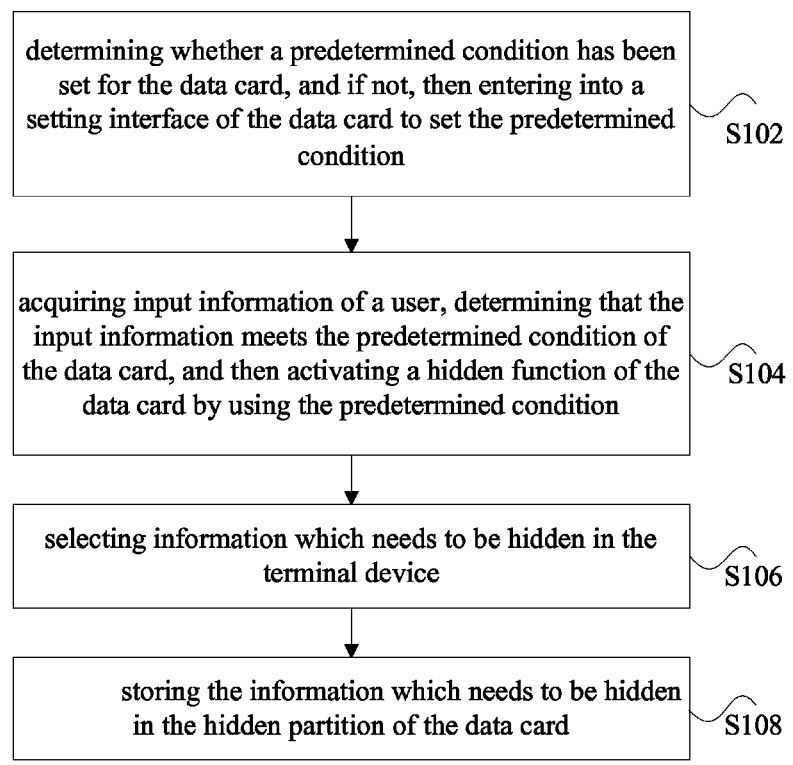
FIG. 1 is a flow chart of a method for protecting information based on a data card according to an embodiment of the present invention.

A method for protecting information based on a data card is provided according to an embodiment of the present invention. FIG. 1 is a flowchart of a method for protecting information based on a data card according to an embodiment of the present invention. As shown in FIG. 1, the method comprises the Steps S102 to S108 as follows:

Step S102, determining whether a predetermined condition has been set for the data card, and if not, then entering into a setting interface of the data card to set the predetermined condition. For example, a data card is connected to a terminal device via a USB interface, and after the installation of drive software in the data card is completed, a predetermined condition of the data card is set when the user first enters into the software interface of the data card. Effective protection for the data card can be achieved by way of the method.

Step S104, acquiring input information of a user; determining that the input information meets the predetermined condition of the data card, and then activating a hidden function of the data card by using the predetermined condition. The predetermined condition can comprise one of the followings: a short message with specific content of a specific user, or a specific key composition. The predetermined condition can be stored in the hidden partition of the data card's flash. The method can perform identity authentication of the user who is using the data card, which enables the user to operate the data card only under the circumstances that the acquired input information meets the predetermined condition, thereby further increasing the security of data information in the data card.

Preferably, in Step S104, under the circumstances that the predetermined condition comprises a short message with specific content of a specific user, determining that the input information meets the predetermined condition of the data card comprises: determining whether addressee's number of the short message in the input information is the number of the specific user, and if yes, determining whether content of the short message in the input information is the specific content, and if yes, then determining that the input information of the user meets the predetermined condition of the data card; or, determining whether content of the short message in the input information and the specific content are the same, and if yes, determining whether addressee's number of the short message in the input information is the number of the specific user, and if yes, then determining that the input information meets the predetermined condition of the data card. This method of authentication has high level security, and is very difficult for those ordinary technicians to break. Thus it can increase the security level of the data card.

Preferably, in Step S104, under the circumstances that the predetermined condition comprises a specific key composition, determining that the input information meets the predetermined condition of the data card comprises: determining whether the input information is the specific key composition, and if yes, then determining that the input information meets the predetermined condition of the data card. The method can be carried out easily, and the operability thereof is strong.

Step S106, selecting information which needs to be hidden in the terminal device. For example, information which needs to be hidden in the terminal device can be selected by software of the data card. The method can make operation of the data card more targeted, and thus increase accuracy and stability of the system.

Step S108, after storing the information which needs to be hidden in the hidden partition of the data card, deleting the information which needs to be hidden and is stored in the terminal device. The information in the terminal device which needs to be protected is stored in the data card through this method. This method completes the protection for the information in the terminal device, avoids the attackers acquiring the information in the data card by means of the web and so on, and increases the satisfaction of the user.

The process of implementing the embodiment of the present invention will be described in detail hereinafter in conjunction with the embodiments.

Embodiment 1

Figure 2:
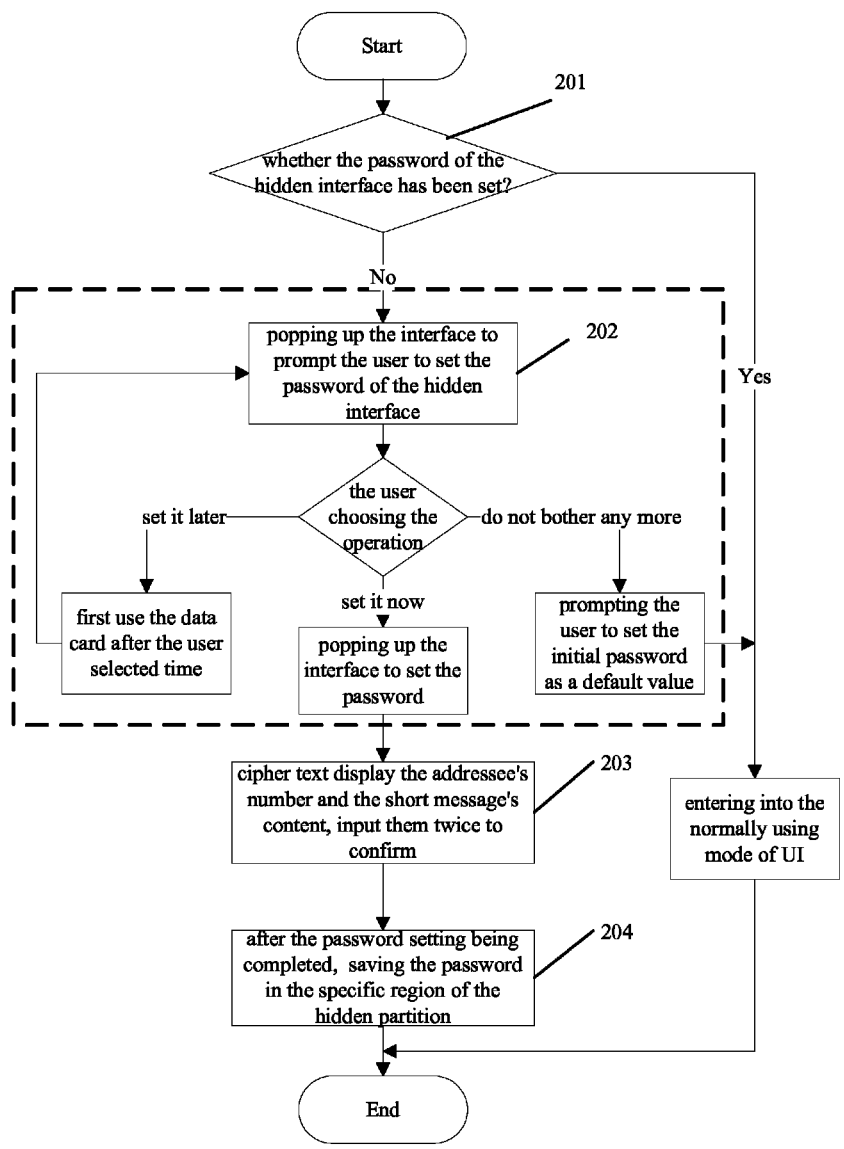
FIG. 2 is a flow chart of setting predetermined condition under the circumstances that the predetermined condition set by a user is a short message with specific content of the specific user according to embodiment 1.

In the example, the method provided by the embodiment of the present invention is described in detail by taking the personal computer (referred as to PC) being the terminal device as an example. The method is used for the mobile terminal data card, wherein sensitive information of the user will be hidden on the software application layer and bottom layer storage medium of the PC side. As a result, it can be more effective than the relevant art in protecting user data. The method comprises Step 1 to Step 3 as follows:

Step 1, setting an initial password (i.e. the above predetermined condition) when the user using the data card for the first time, and popping up automatically a password setting interface by software after the user installing the data card software for the first time. FIG. 2 is a flow chart of setting predetermined condition under the circumstances that the predetermined condition set by a user is a short message with specific content of the specific user according to embodiment 1. As shown in FIG. 2, the above process comprises Step 201 to Step 204 as follows:

Step 201, when the user using the data card for the first time, determining whether the user of the data card has a short message password used to store a hidden module after the installation of the data card PC side software is completed, and if yes, entering into the a normal use mode of the user interface (referred as to UI), otherwise, go to Step 202;

Step 202, if no password has been set, popping up the password setting interface, then the user can choose to set the password immediately, set it later, or set automatically by the data card using the default password; Step 203, the user can set the addressee's number and the short message's content of the password short message, and input them twice to confirm; and Step 204, after the setting being completed, the data card saving the password in the hidden partition of the data card.

Figure 3:
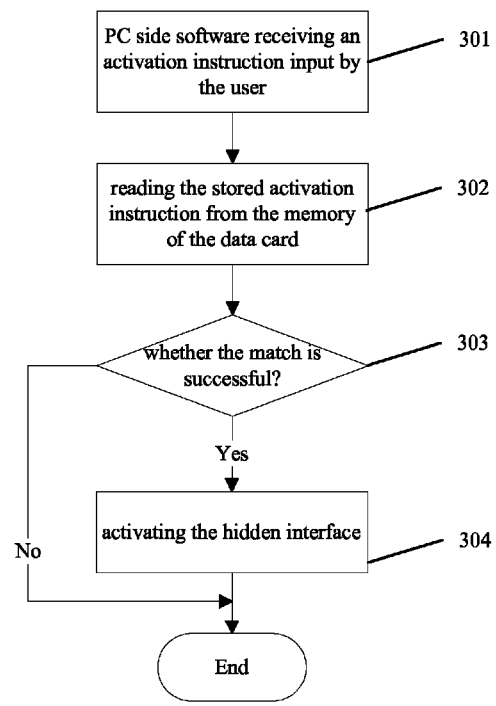
FIG. 3 is a flow chart of activating a hidden interface according to embodiment 1.

Step 2, activating a hidden interface (which may be the data card software or the drive software of the data card and so on) in the PC, and if it is not set by the user, any information about the hidden interface will not appear on the normal interface. The user can activate the hidden interface by means of a preset activation instruction (i.e. the predetermined condition). FIG. 3 is a flow chart of activating a hidden interface according to embodiment 1. As shown in FIG. 3, the above process comprises Step 301 to Step 304 as follows:

Step 301, PC side software receiving an activation instruction input by the user, wherein the way of receiving the activation instruction can include but is not limit to the following two:

a. using an analog short message as the activation instruction (i.e. the predetermined condition is a short message with specific content of a specific user), and determining whether the short message is the activation instruction when the data card software transfers the short message to the data card; and b. using a user defined key composition as the activation instruction (i.e. the predetermined condition is a specific key composition), and after the user presses the key composition when the main interface of the data card software being activated, determining whether the key combination is the activation instruction;

Step 302, reading the stored activation instruction from the memory of the data card;

Step 303, matching (or determining) the activation instruction with the stored activation instruction, and if the match is successful, then go to Step 304, otherwise, ending the procedure; and Step 304, activating the hidden interface.

Figure 4:
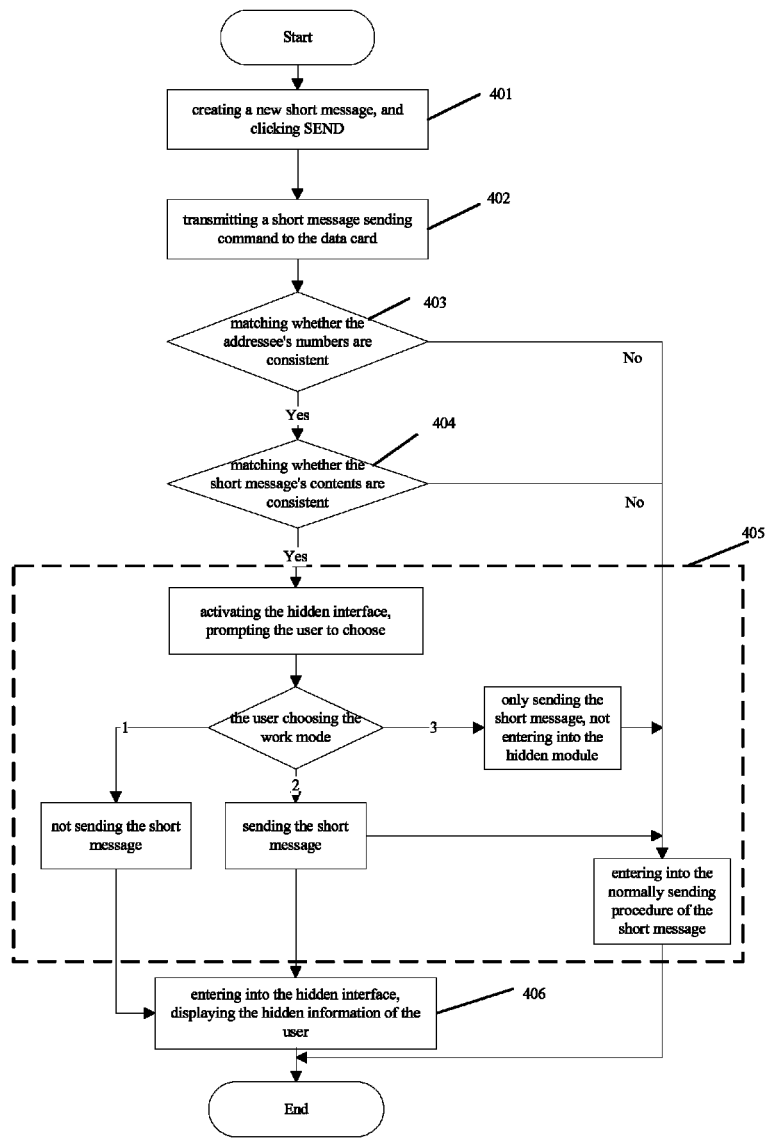
FIG. 4 is a flow chart of activating a hidden interface via sending a message by a user according to embodiment 1.

FIG. 4 is a flow chart of activating a hidden interface via sending a message by a user according to embodiment 1, and the above process comprises the following Step 401 to Step 406, wherein, the sequence of Step 403 and Step 404 can be changed:

Step 401, the user creating a new short message to open the password of the hidden interface in the short message interface, and clicking SEND;

Step 402, transmitting a short message sending command to the data card via the communication port of the data card;

Step 403, matching the addressee's number of the short message with the addressee in the pre-stored password short message (i.e. the analog short message) to determine whether they are consistent, and if yes, then going to Step 404, otherwise, interrupting the match and entering into the normal sending mode of the short message;

Step 404, continuing to match the short message content when the numbers of the short messages are consistent; if they are consistent then go to step 405, and if they are inconsistent then go to the normal sending mode of the short message;

Step 405, activating the hidden interface, popping up a prompt on the interface to ask the user to choose: 1. not sending the short message, and enter into the hidden interface; 2. send the short message, and enter into the hidden interface; 3. send the short message, and not enter into the hidden interface. If the user chooses 1, then go to Step 406; if the user chooses 2, then enter into the normal procedure of sending the short message, and go to Step 406; and if the user chooses 3, then enter into the normal procedure of sending the short message; and Step 406, popping up the hidden interface to display the information of the data card after the user confirms that the hidden interface is open. The user can choose any short message or the contact information in the hidden interface and change the attribute thereof into the hidden state. The user closes the hidden interface to exit after the operation of viewing or editing the hidden information is completed.

Similarly, if using the user defined key composition to control the hidden interface, the above method can comprise the following steps: the user activating the main interface of the data card software, and pressing the key composition; reading the activation key composition (i.e. the user defined key composition) defined by the user from the memory of the data card; matching the key composition pressed by the user with the activation key composition, and if the match is successful, then activating the hidden interface (including the information of the data card); otherwise, the data card software not giving any prompts, and ending the procedure.

Figure 5:
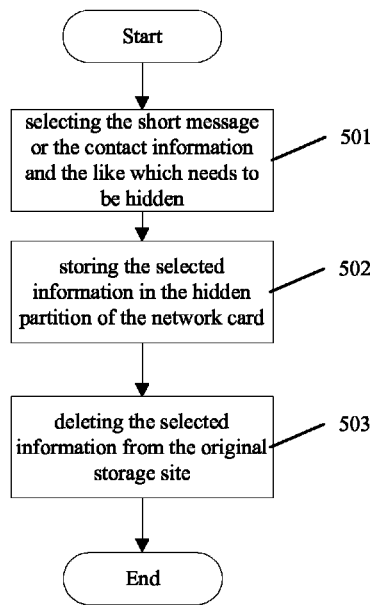
FIG. 5 is a flow chart of hiding the information which needs to be hidden which is set by a user according to embodiment 1.

Step 3, storing individually the information which needs to be hidden set by the user in the hidden region of the data card's bottom layer storage medium, which can further protect the information. FIG. 5 is a flow chart of hiding the information which needs to be hidden which is set by a user according to embodiment 1; the above process particularly comprises Step 501 to Step 503:

Step 501, after the user entering into the hidden interface, selecting the short message or the contact information which needs to be hidden;

Step 502, storing the file in which the user information which needs to be hidden (the selected information) is saved in the hidden partition of the data card's flash; and Step 503, deleting the user information which needs to be hidden (the above selected information) and is previously stored in the computer.

Embodiment 2

In embodiment 2, the method provided by the embodiment of the present invention will be described in conjunction with the embodiment by taking the predetermined condition being a short message with specific content of a specific user as an example. In practical application, the above application procedure of the method for protecting information based on the data card comprises Step 601 to Step 603 as follows:

Step 601, when the user first use the data card, first determines whether the data card has been set a entering password short message of the hidden interface (i.e. the short message with specific content of the specific user) after the application software and the drive are installed in the user computer by the on-card software of the data card. If no password has been set, then the user will get a prompt to set the analog short message password (i.e. the above entering password short message). The user clicks the save after inputting addressee's number "0000" and short message content "password", and the short message password is stored in the hidden partition of the data card's flash by the software. At the same time, the user can choose delay setting password or software no longer need prompt to set according to the interface prompt, and the password short message is generated automatically by the software.

Step 602, when the user uses the software normally, no prompt to enter into the hidden interface will appear in any interface. When the user inputs the short message of the addressee' number "0000" and the short message content "password" and clicks SEND, the match of the above short message input by the user with the analog short message password which has already been set is carried out one by one. If the match fails (i.e. what is sent by the user is an ordinary short message), then transfer to the normal mode of sending the short message and the hidden interface will not be shown; and if the match succeeds, then prompt the user to confirm whether the short message of the addressee' number "0000" and the short message content "password" are sent (i.e. whether the hidden interface is open), and the software performs the corresponding operation according to the user's choice.

Step 603, after opening the hidden interface, the user can view all the short messages and information of business contacts list, and can modify these short messages and contact information and edit the hidden attribute thereof. The short messages and business contacts list having the hidden attribute are stored in the hidden region of the data card's flash after the modification is saved, and the corresponding items stored originally in the computer are deleted. The user closes the hidden interface to exit after completing the operation.

Preferably, storing the short messages and business contacts list having the hidden attribute in the hidden region of the data card's flash can comprise: a flash storage being disposed in the data card, a part of which being used as the hidden partition for storing the short message and the user's information. In particular, the short messages and the contact information selected by the user which needs to be hidden can be saved as a data file. Then, the data card stores the file in the hidden partition.

By means of the above solution, even if the data card is connected to the computer, hackers and the other attackers still cannot know the existence of the user's private information. Thereby this solution protects the user's privacy relatively thoroughly.

Apparatus Embodiment

Figure 6:
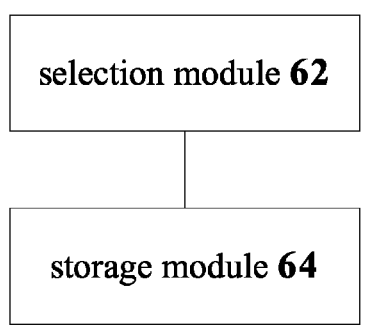
FIG. 6 is a block diagram showing the structure of an apparatus for protecting information based on a data card according to an embodiment of the present invention.

An apparatus for protecting information based on a data card is provided according to the embodiment of the present invention, and the apparatus is used to implement the method for protecting information based on the data card described by the above method embodiments. FIG. 6 is a block diagram showing the structure of an apparatus for protecting information based on a data card according to an embodiment of the present invention. As shown in FIG. 6, the apparatus comprises a selection module 62 and a storage module 64. The apparatus will be described in detail hereinafter.

The selection module 62 is configured to select information which needs to be hidden in a terminal device. And the storage module 64 is coupled to the selection module 62 and is configured to store said information which needs to be hidden in a hidden partition of the data card.

By means of the embodiment of the present invention, the problem in relevant art that the security of methods for protecting the data information is relatively low is solved by adopting the way of storing the data information need to be protected in the terminal device in the hidden partition of the data card, which makes attackers not perceive the existence of the information and increases the security of the data information in the terminal device.

Figure 7:
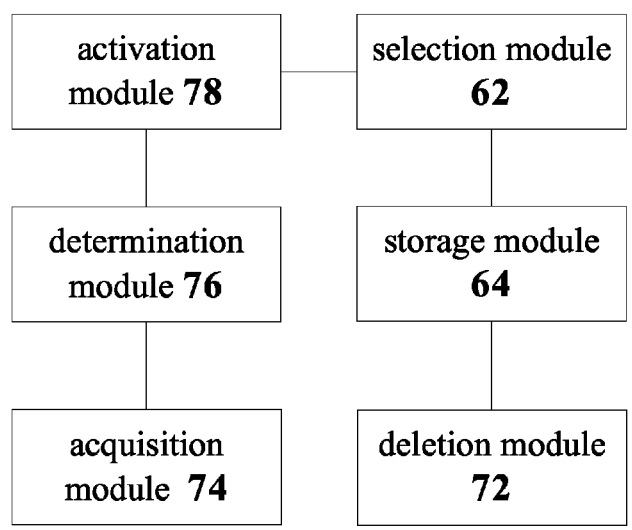
FIG. 7 is a block diagram showing the structure of an apparatus for protecting information based on a data card according to a preferable embodiment of the present invention.

FIG. 7 is a block diagram showing the structure of an apparatus for protecting information based on a data card according to a preferable embodiment of the present invention. As shown in FIG. 7, on the basis of the FIG. 6, and the above apparatus further comprises: a deletion module 72, which is connected to the storage module 64 and is configured to delete information of the data card stored in the terminal device.

Preferably, the above apparatus further comprises: an acquisition module 74, configured to acquire input information of a user; a determination module 76, which is coupled to the acquisition module 74 and is configured to determine that the input information meets predetermined condition of the data card; and an activation module 78, which is coupled to the determination module 76 and the selection module 62 and is configured to activate a hidden function of the data card by using the predetermined condition.

Preferably, the predetermined condition can comprise one of the following: a short message with specific content of a specific user, or a specific key composition.

It should be noted that the apparatus for protecting information based on the data card which is described in the apparatus embodiment is corresponding to the above method embodiments. The particular implementation thereof has been described in detail in the above method embodiments, and will not be described here redundantly.

In summary, the solution for protecting information based on the data card which is provided by the embodiments of the present invention increases the security of the data information in the terminal device, so as to protect the user's private information better.

It should be noted that steps shown in the flow chart of the drawings can be executed in, for example, a computer system with a group of computer executable instructions. Moreover, although the logical order is shown in the flow chart, in some cases, the steps shown or described can be carried out in a different order.

Obviously, those skilled in the art should understand that the above modules and steps of the present invention can be realized by using general purpose calculating device, which can be integrated in one calculating device or distributed on a network which consists of a plurality of calculating devices. Alternatively, they can be realized by using the executable program code of the calculating device. Consequently, they can be stored in the storing device and executed by the calculating device. Or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims should comprise any modification, equivalent substitution and improvement within the spirit and principle of the present invention.

What is claimed is:

1. A method for protecting information based on a data card which is used for a mobile terminal, comprising:
    acquiring input information of a user using a main interface;
    upon said input information meeting a predetermined condition, activating a hidden function of said data card, wherein said hidden function includes presenting a hidden interface different from said main interface;
    selecting information which needs to be hidden using said hidden interface in a terminal device; and
    storing said information which needs to be hidden in a hidden partition of the data card;
    wherein said predetermined condition comprises: a short message with specific content of a specific user or a specific key composition; wherein determining that said input information meets said predetermined condition of said data card comprises:
    determining whether an addressee's number of a short message in said input information is the number of said specific user, and if yes, determining whether the content of the short message in said input information is said specific content, and if yes, then determining that said input information meets said predetermined condition of said data card; or
    determining whether the content of the short message in said input information is said specific content, and if yes, determining whether the addressee's number of the short message in said input information is the number of said specific user, and if yes, then determining that said input information meets said predetermined condition of said data card; or
    determining whether said input information is said specific key composition, and if yes, then determining that said input information meets said predetermined condition of said data card,
    wherein the hidden function of said input information is not activated in the case that said input information fails to meet said predetermined condition.

2. The method according to claim 1, wherein after storing said information which needs to be hidden in the hidden partition of the data card, the method further comprises:
    deleting said information which needs to be hidden and is stored in said terminal device.

3. The method according to claim 2, wherein before selecting the information which needs to be hidden in the terminal device, the method further comprises:
    determining whether said predetermined condition has been set for said data card, and if not, then entering into a setting interface of said data card to set said predetermined condition.

4. The method according to claim 1, wherein said predetermined condition is stored in said hidden partition of the data card's flash.

5. The method according to claim 4, wherein before selecting the information which needs to be hidden in the terminal device, the method further comprises:
    determining whether said predetermined condition has been set for said data card, and if not, then entering into a setting interface of said data card to set said predetermined condition.

6. The method according to claim 1, wherein before selecting the information which needs to be hidden in the terminal device, the method further comprises:
    determining whether said predetermined condition has been set for said data card, and if not, then entering into a setting interface of said data card to set said predetermined condition.

7. An apparatus for protecting information based on a data card which is used for a mobile terminal, comprising:
    a selection module, configured to select information which needs to be hidden in a terminal device; and
    a storage module, configured to store said information which needs to be hidden in a hidden partition of the data card;
    an acquisition module, configured to acquire input information of a user;
    a determination module, configured to determine that said input information meets a predetermined condition of said data card, wherein said predetermined condition comprises a short message with specific content of a specific user or a specific key composition; and determining that said input information meets said predetermined condition of said data card comprises:
    determining whether an addressee's number of a short message in said input information is the number of said specific user, and if yes, determining whether the content of the short message in said input information is said specific content, and if yes, then determining that said input information meets said predetermined condition of said data card; or
    determining whether the content of the short message in said input information is said specific content, and if yes, determining whether the addressee's number of the short message in said input information is the number of said specific user, and if yes, then determining that said input information meets said predetermined condition of said data card; or
    determining whether said input information is said specific key composition, and if yes, then determining that said input information meets said predetermined condition of said data card;
    an activation module, configured to activate a hidden function of said data by using said predetermined condition; wherein said hidden function includes presenting a hidden interface,
    wherein the hidden function of said input information is not activated in the case that said input information fails to meet said predetermined condition.

8. The apparatus according to claim 7, further comprising:
    a deletion module, configured to delete the information of said data card stored in said terminal device.

* * * * *